(12) United States Patent
Shpunt et al.

(10) Patent No.: US 10,345,684 B2
(45) Date of Patent: Jul. 9, 2019

(54) PATTERN PROJECTION AND IMAGING USING LENS ARRAYS

(71) Applicant: Apple Inc., Cupertino, CA (US)

(72) Inventors: Alexander Shpunt, Portola Valley, CA (US); Benny Pesach, Rosh Ha'ayin (IL)

(73) Assignee: APPLE INC., Cupertino, CA (US)

( * ) Notice: Subject to any disclaimer, the term of this patent is extended or adjusted under 35 U.S.C. 154(b) by 645 days.

(21) Appl. No.: 14/848,490

(22) Filed: Sep. 9, 2015

(65) Prior Publication Data

US 2016/0004145 A1 Jan. 7, 2016

Related U.S. Application Data

(62) Division of application No. 13/311,589, filed on Dec. 6, 2011, now Pat. No. 9,167,138.

(60) Provisional application No. 61/419,891, filed on Dec. 6, 2010.

(51) Int. Cl.
| | |
|---|---|
| *G06K 9/20* | (2006.01) |
| *G03B 21/14* | (2006.01) |
| *H04N 5/262* | (2006.01) |
| *H04N 5/232* | (2006.01) |
| *H04N 13/271* | (2018.01) |
| *H04N 5/225* | (2006.01) |
| *G06T 7/50* | (2017.01) |
| *H04N 5/341* | (2011.01) |

(52) U.S. Cl.
CPC .......... *G03B 21/14* (2013.01); *G06K 9/2036* (2013.01); *G06T 7/50* (2017.01); *H04N 5/2254* (2013.01); *H04N 5/23238* (2013.01); *H04N 5/262* (2013.01); *H04N 5/3415* (2013.01); *H04N 13/271* (2018.05); *G06K 2209/40* (2013.01)

(58) Field of Classification Search
CPC ............ G01N 21/8806; G01N 21/9501; G03F 7/70341; G03F 7/70225; G02B 17/0808; G02B 17/0856; G02B 17/0892; G02B 17/0812; G02B 21/02; G02B 5/001; G01B 11/2527; G01B 11/25; H04N 5/2254; H04N 13/0271; H04N 5/262; H04N 5/23238; G03B 21/14; G06T 7/50; G06K 9/2036; G06K 2209/40
See application file for complete search history.

(56) References Cited

U.S. PATENT DOCUMENTS

| | | | | |
|---|---|---|---|---|
| 2004/0130730 | A1* | 7/2004 | Cantin ............... | G01B 11/2527 356/604 |
| 2004/0218262 | A1* | 11/2004 | Chuang ............. | G01N 21/8806 359/366 |
| 2005/0281029 | A1* | 12/2005 | Inamoto ................... | H04N 5/74 362/234 |
| 2007/0183943 | A1* | 8/2007 | Golovkina ........... | B01J 19/0046 422/186.3 |
| 2008/0240502 | A1* | 10/2008 | Freedman .......... | G01B 11/2513 382/103 |
| 2009/0096783 | A1* | 4/2009 | Shpunt ................... | G01B 11/25 345/419 |

(Continued)

*Primary Examiner* — Roberto Velez
*Assistant Examiner* — Tuan H Le
(74) *Attorney, Agent, or Firm* — Kligler & Associates

(57) ABSTRACT

A method for projection includes generating a pattern of illumination, and positioning an array of lenses so as to project different, respective parts of the pattern onto a scene.

8 Claims, 5 Drawing Sheets

(56) References Cited

U.S. PATENT DOCUMENTS

2010/0118123 A1* 5/2010 Freedman .............. G01B 11/25
348/46

* cited by examiner

PATTERN PROJECTION AND IMAGING USING LENS ARRAYS

CROSS-REFERENCE TO RELATED APPLICATION

This application is a division of U.S. patent application Ser. No. 13/311,589, filed Dec. 6, 2011, which claims the benefit of U.S. Provisional Patent Application 61/419,891, filed Dec. 12, 2010. It is related to U.S. patent application Ser. No. 13/311,584, filed Dec. 6, 2011, entitled "Lens Arrays for Pattern Projection and Imaging," now U.S. Pat. No. 9,131,136 All of these related applications are incorporated herein by reference.

FIELD OF THE INVENTION

The present invention relates generally to optical projection and imaging, and specifically to devices and methods that use arrays of lenses to enhance the performance and characteristics of projection and imaging systems.

BACKGROUND

In most optical imaging and projection systems, the optical elements are arranged in series along a single optical axis. Some systems, however, use arrays of lenses arranged side by side. The best-known arrangement of this sort is the "fly's eye" lens array, which is generally used to achieve uniform irradiance in projection optics.

Lens arrays are also used in some imaging devices. For example, U.S. Pat. No. 7,700,904, whose disclosure is incorporated herein by reference, describes a compound-eye imaging device, which comprises nine optical lenses arranged in a matrix array of three rows and three columns, and a solid-state imaging element for capturing unit images formed by the optical lenses. A stray light blocking member having a rectangular-shaped window is provided on the capture zone side of the optical lenses to block incident lights in a range outside each effective incident view angle range of each optical lens.

In general, the optics used in an imaging device are designed to form a single image on an image sensor. In some applications, however, multiple images may be superimposed. Such a scheme is described, for example, by Marcia et al., in "Superimposed Video Disambiguation for Increased Field of View," *Optics Express* 16:21, pages 16352-16363 (2008), which is incorporated herein by reference. The authors propose a method for increasing field of view (FOV) without increasing the pixel resolution of the focal plane array (FPA) by superimposing multiple sub-images within a static scene and disambiguating the observed data to reconstruct the original scene. According to the authors, this technique, in effect, allows each sub-image of the scene to share a single FPA, thereby increasing the FOV without compromising resolution.

Various methods are known in the art for optical 3D mapping, i.e., generating a 3D profile of the surface of an object by processing an optical image of the object. This sort of 3D map or profile is also referred to as a depth map or depth image, and 3D mapping is also referred to as depth mapping.

Some methods of 3D mapping are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

SUMMARY

Embodiments of the present invention that are described hereinbelow provide improved methods and apparatus for light projection and imaging using lens arrays.

There is therefore provided, in accordance with an embodiment of the present invention, imaging apparatus, which includes an image sensor, including an array of detector elements, and objective optics, which are configured to focus optical radiation and are positioned so as to form multiple, respective optical images of different areas of a scene onto a common area of the array. The apparatus includes means for optically encoding the optical images with different, respective coding patterns, and a processor, which is configured to process an output signal from the sensor element by matched filtering of the coding patterns in order to reconstruct electronic images of the different areas of the scene.

In some embodiments, the means for optically encoding include multiple coded apertures, which are configured and positioned to optically modulate the respective optical images formed of the different areas of the scene. Typically, the objective optics include multiple lenses, which are configured to form the respective optical images, wherein each of the coded apertures is associated with an optical aperture of a respective one of the lenses.

In other embodiments, the means for optically encoding include a projection module, which is configured to project the respective coding patterns onto the different areas of the scene. The processor may be configured to process the reconstructed electronic images so as to generate a depth map of the scene responsively to the pattern appearing in the optical images of the respective portions of the scene.

In a disclosed embodiment, the coding patterns are mutually orthogonal. The processor may be configured to reconstruct the electronic images of the different areas of the scene by applying to the output signal respective deconvolution kernels, based on the respective coding patterns.

In some embodiments, the apparatus includes a projection module, which is configured to project an optical pattern onto the scene, wherein the processor is configured to process the electronic images so as to generate a depth map of the scene responsively to the pattern appearing in the optical images of the respective portions of the scene. The processor may be configured to select a sector of the depth map, to instruct the projection module to project the optical pattern only in the selected sector, and to process the output signal so as to generate a further depth map of the selected sector with enhanced resolution.

There is further provided, in accordance with an embodiment of the present invention, projection apparatus, including an illumination source, which is configured to generate a pattern of illumination, and an array of lenses, positioned so as to project different, respective parts of the pattern onto a scene.

In a disclosed embodiment, the illumination source includes a light source and a condenser, which are configured to generate a beam of light, and a transparency, which is interposed in the beam. The pattern may include light and dark spots.

The lenses may be configured to project the respective parts of the pattern onto different, respective areas of the scene or to project the respective parts of the pattern onto a common area of the scene.

In some embodiments, the apparatus includes an imaging module, which is configured to generate electronic images of the pattern on the scene, and a processor, which is configured to process the electronic images so as to generate a depth map of the scene responsively to the pattern appearing in the images.

There is also provided, in accordance with an embodiment of the present invention, a method for imaging, which includes focusing optical radiation so as to form multiple, respective optical images of different areas of a scene on a common area of an array of detector elements. The optical images are optically encoded with different, respective coding patterns. An output signal from the sensor element is processed by matched filtering of the coding patterns in order to reconstruct electronic images of the different areas of the scene.

There is additionally provided, in accordance with an embodiment of the present invention, a method for projection, which includes generating a pattern of illumination, and positioning an array of lenses so as to project different, respective parts of the pattern onto a scene.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow use lens arrays in novel ways to enhance the performance of optical imaging systems and of pattern projectors. In the disclosed embodiments, the lenses in an array are typically used together to form respective images on the same image sensor, or to project different parts of a pattern.

The embodiments of the present invention that are described hereinbelow are useful particularly in pattern-based depth mapping. Therefore, for clarity and convenience of presentation, these embodiments are shown and described in the context of the components of a depth mapping system. The principles of these embodiments, however, may also be used in other electronic imaging and optical projection applications, all of which are considered to be within the scope of the present invention.

Figure 1:
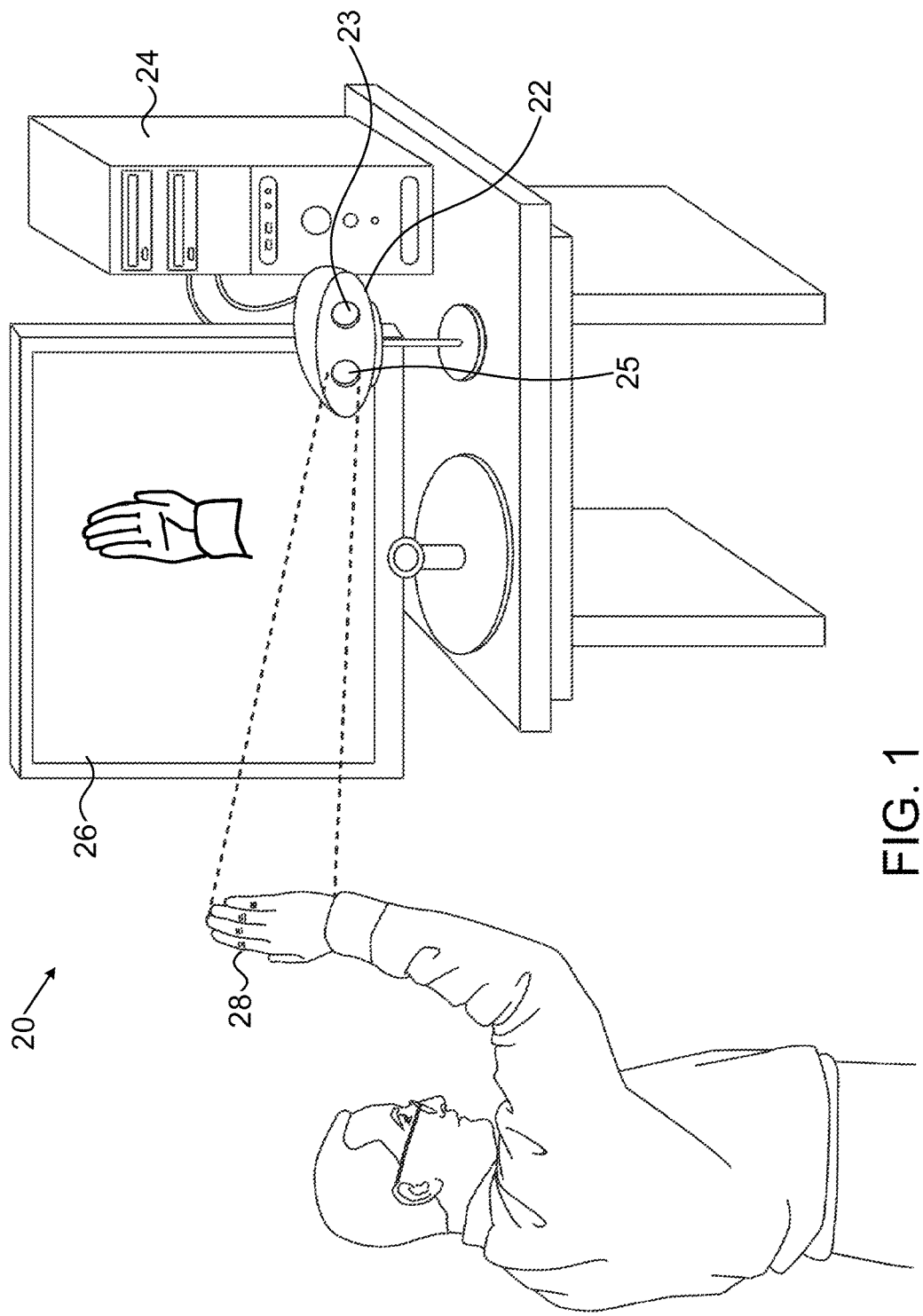
FIG. 1 is a schematic, pictorial illustration of a system for three-dimensional (3D) mapping, in accordance with an embodiment of the present invention.

FIG. 1 is a schematic, pictorial illustration of a system 20 for 3D mapping, in accordance with an embodiment of the present invention. In this example, an imaging device 22 is configured to capture images and generate 3D maps of a scene. The scene here includes a user 28 of the system (who is thus, in this case, the "object" of the imaging device, as well as its operator). The depth information in the 3D maps may be used by a host computer 24 as part of a 3D user interface, which enables the user to interact with games and other applications running on the computer and with elements shown on a display screen 26. (This sort of functionality is described, for example, in U.S. Patent Application Publication 2009/0183125, whose disclosure is incorporated herein by reference.) This particular application of system 20 is shown here only by way of example, however, and the mapping capabilities of system 20 may be used for other purposes, as well, and applied to substantially any suitable type of scenes and 3D objects.

In the example shown in FIG. 1, imaging device 22 comprises a projection module 23, which projects a pattern of optical radiation onto the scene, and an imaging module 25, which captures an image of the pattern that consequently appears on the body of user 28 and other objects in the scene (not shown in the figure). The optical radiation that is used for this purpose is typically, although not necessarily, in the infrared (IR) range, although visible or ultraviolet (UV) light may similarly be used. The terms "optical radiation," "illumination," and "light" are used synonymously in the present patent application and should be understood to include any or all of the IR, visible, and UV ranges. Module 23 may be designed to emit radiation in a narrow optical band, and a corresponding bandpass filter may be used in imaging module 25 in order to reduce the amount of ambient light detected by the imaging module.

A processor, such as computer 24 or an embedded processor (not shown) in device 22, processes the image of the pattern in order to generate a depth map of the body, i.e., an array of 3D coordinates, comprising a depth (Z) coordinate value of the body surface at each point (X,Y) within a predefined field of view. (In the context of an array of image-related data, these (X,Y) points are also referred to as pixels.) In the present embodiment, the processor computes the 3D coordinates of points on the surface of the user's body by triangulation, based on transverse shifts of the spots in the pattern, as described in the above-mentioned PCT publications WO 2007/043036, WO 2007/105205 and WO 2008/120217. This technique is referred to herein as "pattern-based depth mapping." The functionality of a processor similar to that in system 20 is further described, for example, in U.S. Patent Application Publication 2010/0007717, whose disclosure is incorporated herein by reference.

For many practical applications, it is advantageous that imaging module 25 have a wide field of view (FOV)—on the order of 90-120° or more in the horizontal direction and 60-90° or more in the vertical direction. The imaging module is also expected to provide a clear image of the pattern over a wide range of ambient light conditions, including scenes with a bright ambient background, which tends to reduce the contrast of the pattern in the captured images. On the other hand, power and safety considerations limit the output intensity of projection module 23. The embodiments that are described hereinbelow address these issues.

Imaging Module with On-Board Ambient Cancellation

Figure 2A:
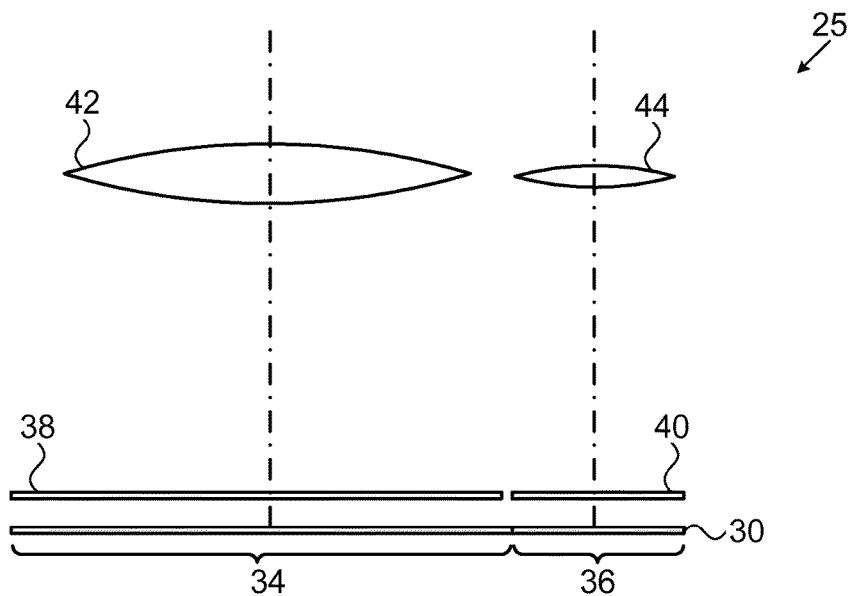
FIG. 2A is a schematic side view of an imaging module, in accordance with an embodiment of the present invention.
Figure 2B:
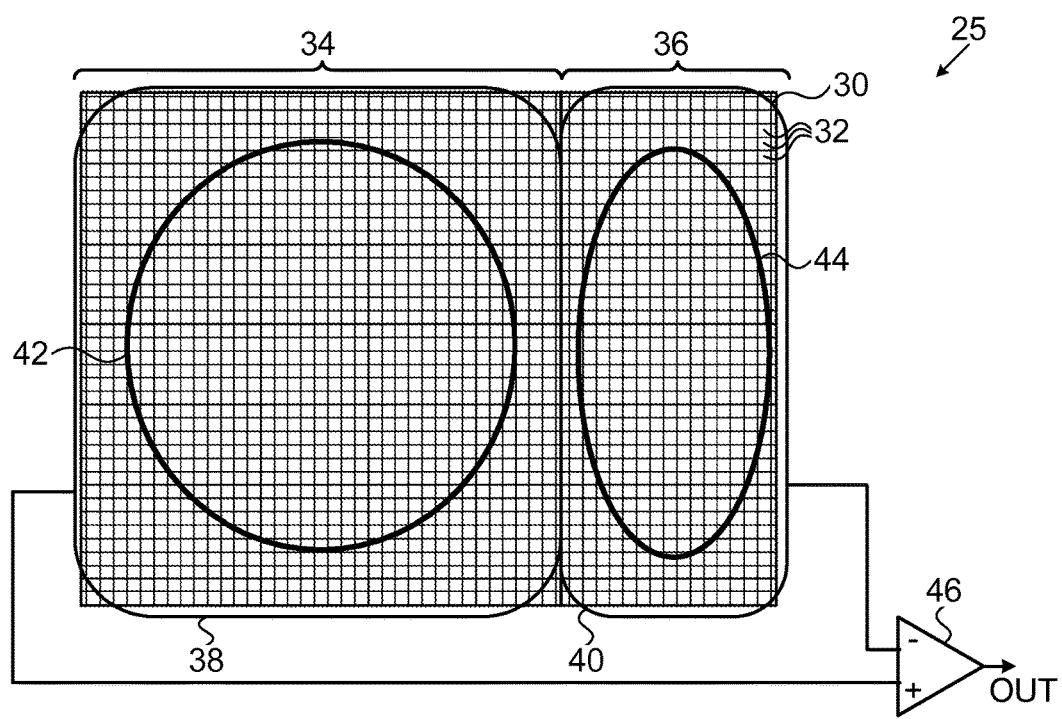
FIG. 2B is a schematic frontal view of the imaging module of FIG. 2A.

FIGS. 2A and 2B schematically illustrate an ambient light cancellation arrangement in imaging module 25, in accordance with an embodiment of the present invention. FIG. 2A is a side view showing an image sensor 30 and other elements of module 25, while FIG. 2B is a frontal view.

Image sensor 30 may be, for example, a CMOS device or CCD, comprising an array of detector elements 32. (For convenience of illustration, only a small number of detector elements is shown in the figure, while in actuality the array typically contains a much larger number of elements, generally well in excess of one million.) The detector elements are typically uniform in size and functionality over the matrix, but in this embodiment they are divided into two regions 34 and 36. The regions may be of the same size and shape, but for enhanced resolution of the specific image captured by region 34, it may be advantageous that region 34 is wider and thus includes a larger number of columns of detector elements 32, for example, twice as many columns as region 36. Both regions, however, have the same number of rows.

Objective optics, comprising lenses 42 and 44 form images of the scene of interest on regions 34 and 36, respectively, of sensor 30. Typically, the lenses are designed and oriented so that regions 34 and 36 capture images containing a common field of view. The image formed by lens 44 may therefore be distorted in the horizontal direction in order to fit into the narrower shape of region 36. Although, for the sake of simplicity, only a single lens is shown for each region, in practice arrays of multiple lenses may be used. Alternatively, a single lens (or group of lenses) with a suitable beamsplitting arrangement following the lens may be used to form the images on both of regions 34 and 36. Although lenses 42 and 44 are pictured as simple lenses, in practice compound lenses may be used in this and all the other embodiments of imaging module 25.

Lens 42 forms its image through a bandpass filter 38, which passes light of the wavelength (typically IR) that is emitted by projection module 23. Thus, region 34 senses an image of the pattern that has been projected by module 23 onto the scene of interest, along with whatever ambient light is reflected from the scene in the passband of the filter. On the other hand, lens 44 forms its image through a bandpass filter 40, whose passband does not include the wavelength of projection module 23. Thus, region 36 senses only ambient background radiation from the scene. The passband of filter 40 may be selected to be near that of filter 38 and of similar bandwidth, so that the image received by region 36 will provide a faithful measure of the ambient light component in the image received by region 34.

The ambient input signal from the rows of detector elements 32 in region 36 is thus indicative of the level of the ambient component in the input image signal from the corresponding rows in region 34. A subtracter takes a difference between this ambient component from region 36 and the input image signal generated by region 34 in order to generate an output signal representing to an electronic image of the pattern on the scene with improved signal/background ratio and hence improved contrast. Because the pixels in regions 34 and 36 are row-aligned, the image signals from the two regions are inherently synchronized. When a rolling shutter is used in image sensor 30 (as is common in CMOS-type sensors), the simultaneous capture and readout of the pixels in the two regions enables imaging module 25 to operate on non-static scenes without motion artifact.

One way to subtract the ambient component is to digitize the respective raw images from regions 34 and 36 and then subtract the digital pixel values using a suitable digital processor, such as computer 24 or hardware logic (not shown) in device 22. If region 36 is narrower than region 34, as shown in the figures, the pixel values in region 36 may be interpolated before subtraction.

Since the points of view of lenses 42 and 44 are slightly different, the images formed on regions 34 and also have slightly different perspectives (although typically, the disparity is less than ¾ of the sensor width). It is beneficial to register the pixels of the image in region 36 with those in region 34 prior to subtracting. Such registration can be achieved, for example, using optical flow techniques that are known in art. Prior to performing the subtraction, the image in region 36 is interpolated onto the image in region 34 so as to represent the same pixels, same point of view and same overall optical gain. (Gain correction can be important, since filters 38 and 40 are different.)

Alternatively, as illustrated in FIG. 2B, the subtraction may be carried out on the image sensor chip in the analog domain. For this purpose, regions 34 and 36 may have separate readout circuits, which are clocked so that each pixel in region 34 is read out at the same time as the corresponding pixel in region 36. (The clock rates may be adjusted for the difference in widths of the regions.) An analog component, such as a differential amplifier 46 on the integrated circuit chip of the image sensor serves as the subtracter in this case, subtracting the signal level in region 36 from the signal level of the corresponding pixel in region 34, so that the output from image sensor 30 is already corrected for ambient background.

To improve accuracy of the results, image sensor 30 may also comprise circuitry for performing local operations of optical flow and gain modification, to ensure that the image signals from regions 34 and 36 have locally the same point of view and gain.

Imaging Module with Wide Field of View

Figure 3A:
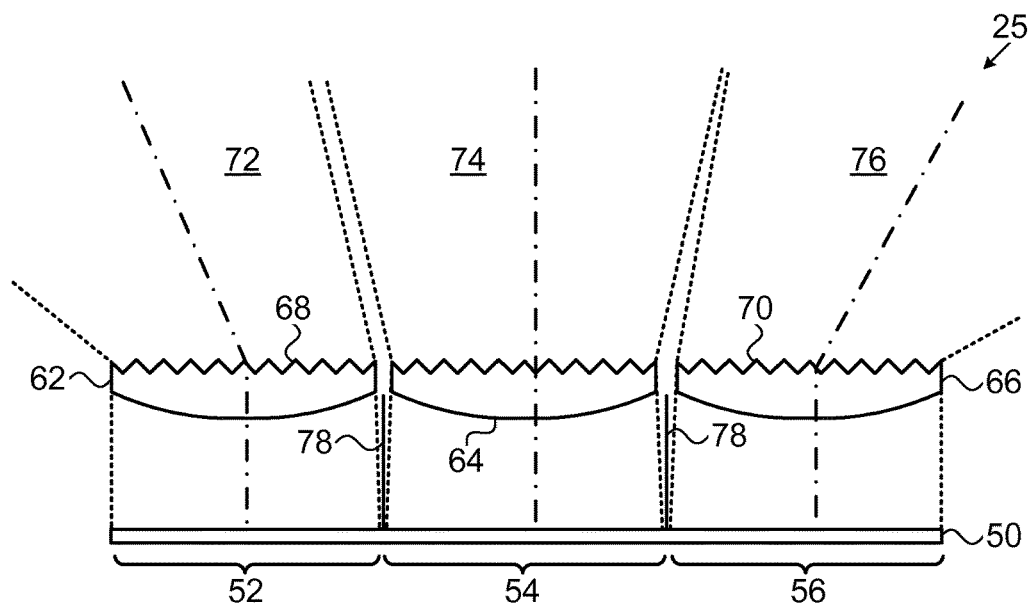
FIG. 3A is a schematic side view of an imaging module, in accordance with another embodiment of the present invention.
Figure 3B:
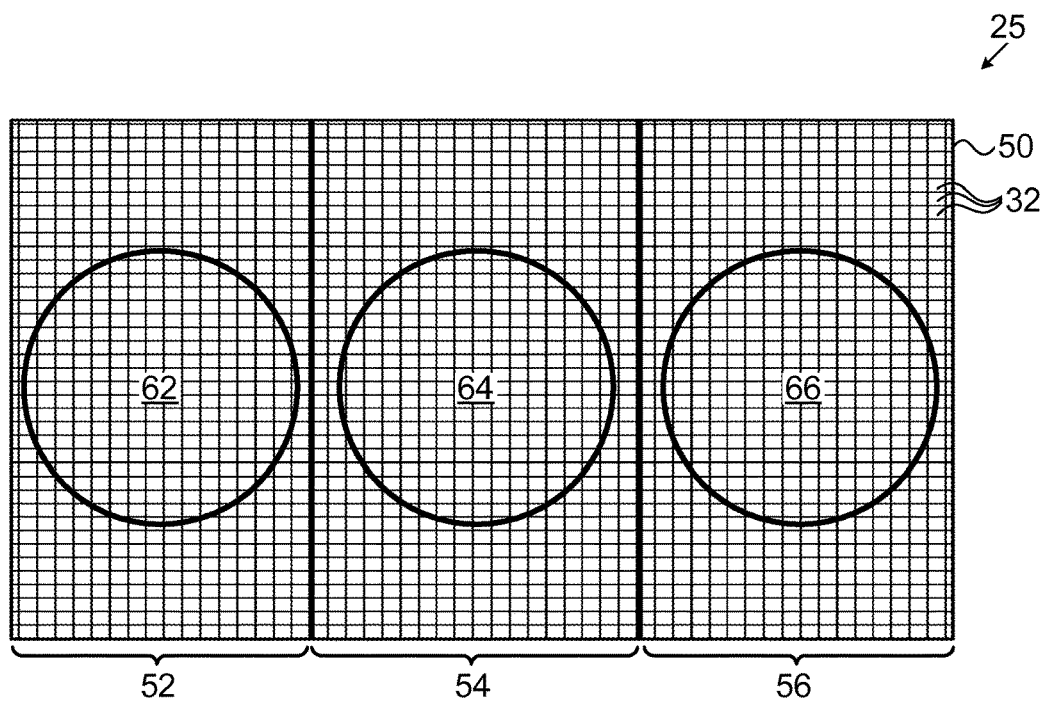
FIG. 3B is a schematic frontal view of the imaging module of FIG. 3A.

FIGS. 3A and 3B schematically illustrate an optical arrangement of imaging module 25 that provides a wide field of view (FOV) in a compact, low-cost optical design, in accordance with an embodiment of the present invention. FIG. 3A is a side view showing an image sensor 50 and other elements of module 25, while FIG. 3B is a frontal view. The principles of this embodiment may be combined with those of the embodiments of FIGS. 2A and 2B to give both wide FOV and ambient light rejection.

Image sensor 50 in this embodiment is divided into three regions 52, 54 and 56, each with its own lens 62, 64, 66. Image sensor 50 may be a standard CMOS device or CCD. The lenses in this case are assumed to be refractive, although diffractive or combinations of refractive and diffractive elements may alternatively be used for the same purpose. Furthermore, although the pictured embodiment divides the image sensor into only three regions with respective lenses, a smaller or larger number of regions and lenses may be used. In the embodiment shown in FIGS. 3A and 3B, lenses 62, 64 and 66 are arranged in a single row, thus expanding the FOV of module 25 in one direction only (the horizontal direction relative to the pages of these figures), but a two-dimensional array of lenses may likewise be used to expand the FOV in both horizontal and vertical directions.

Each of lenses 62, 64 and 66 has a respective FOV 72, 74, 76, as shown in FIG. 3A. At least two of the lenses, such as lenses 62 and 66, also have a diverting element, such as Fresnel prisms 68 and 70, fixed to one of their surfaces, such as the front surface in the pictured embodiment. These diverting elements deflect the respective optical axes of the lenses on the front side of module 25 (i.e., the side facing toward the scene and away from image sensor 50) angularly outward relative to the center of image sensor 50. The angle of deflection of prisms 68 and 70 is chosen so that fields of view 72 and 76 look outward and overlap only slightly at their inner borders with FOV 74.

As a result, module 25 has an overall FOV that is three times the width of the individual FOV of each of the lenses. Each of regions 52, 54 and 56 thus receives an image of a different part of the overall FOV, although it is possible that the images may overlap or that there may be gaps between the images. An image processor, such as computer 24 or a processor embedded in device 22, may process the electronic image output from sensor 50, if necessary, for proper blending and avoidance of artifacts at the borders between the regions. In order to prevent stray light from passing between the lenses, separator walls 78 may be interposed between the channels. Similar sorts of separators may be used in the other embodiments described herein (but they are omitted from the figures for the sake of simplicity).

Module 25 as shown in FIGS. 3A and 3B may achieve an overall FOV of 90-120° with good image quality throughout (at least sufficient for the purposes of system 20). Normally, good image quality over a FOV this wide requires a large, costly lens, extending a large distance forward from the image sensor. By using an array of lenses, on the other hand, the present embodiment achieves the same FOV with a much more compact, less costly design, and improved performance, since the FOV of each of lenses 62, 64, 66 is only one-third of the overall FOV. The use of diffractive technology for this purpose enables Fresnel prisms 68 and 70 to be fabricated as part of the lenses themselves and avoids the need for bulky refractive prisms or reflective elements.

Figure 4:
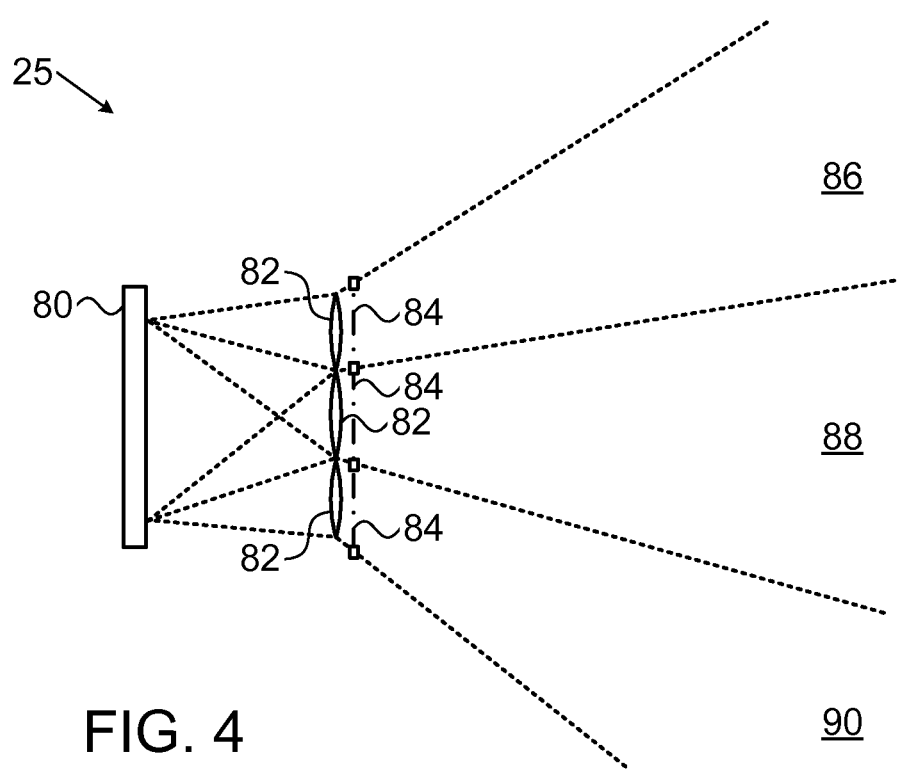
FIG. 4 is a schematic side view of an imaging module, in accordance with yet another embodiment of the present invention.

FIG. 4 is a schematic side view of an optical arrangement of imaging module 25 that provides a wide field of view (FOV) in a compact, low-cost optical design, in accordance with another embodiment of the present invention. In this embodiment, too, an array of lenses 82 images the scene of interest onto an image sensor 80, wherein each lens captures the image in a respective FOV 86, 88, 90, . . . . In this case, there are nine lenses 82 in a 3×3 array (although only three of the lenses are seen in the side view of FIG. 4), but again, larger or smaller numbers of lenses may be used in either a one- or two-dimensional array. Alternatively, a single imaging lens may be used, with a suitable arrangement of beam combiners to multiplex and superimpose all of FOVs 86, 88, 90, . . . , through this same lens.

In contrast to the preceding embodiment, in the present embodiment all of lenses 82 cast their respective images of different areas of the scene onto a common area (typically the entire area) of the array of detector elements 32 in sensor 80. Thus, each of FOVs 86, 88, 90, . . . is imaged with the full resolution of sensor 80. The signal output by the sensor, however, becomes a superposition of the images of all the individual fields of view. An image processor, such as computer 24 or a processor embedded in device 22, separates out the individual images by a process of matched filtering of the output signal from sensor 80, in order to reconstruct the specific images of the individual fields of view. These specific images may be stitched together or otherwise processed over the entire, combined FOV in order to provide an image with both wide FOV and high resolution.

The matched filtering performed by the image processor is based on optical encoding of the images formed by lenses 82 with different, respective coding patterns. Various means may be used to perform this encoding. For example, the individual image formed by each lens 82 may be optically encoded, using means such as a respective coded aperture 84 associated with the optical aperture of each lens 82. A coded aperture, as is known in the art, applies a predetermined spatial modulation to the incoming light, which may be either an amplitude modulation or a phase modulation or a combination of the two. The resulting individual image formed at the focus of the lens on image sensor 80 is then a convolution of the result of geometrical optical imaging with the Fourier transform of the aperture modulation function (representing the diffraction effects). Appropriate defocusing will thus cause a geometrical image of the aperture to appear as the image of a point source, and the modulated image will be a convolution of the aperture with the original unmodulated image.

A set of mutually-orthogonal modulation functions may be chosen, with a different one of the functions applied by each of the different apertures 84. The modulation functions are "mutually orthogonal" in the sense that the spatial correlation between any pair of the functions is insignificant by comparison to the autocorrelation of each function with itself. Each function will then have a different, respective deconvolution kernel, which serves as a matched filter for the image formed through the corresponding aperture 84. To extract the individual image formed by each of lenses 82, the image processor performs a succession of deconvolution operations using the respective kernels or alternatively solves simultaneously for all the individual images. The deconvolution of the individual images and reconstruction of the combined FOV can be performed frame by frame, without reliance on previous image frames or other temporal information.

As another alternative, projection module 23 may serve as the means for encoding the images by projecting a pattern chosen so that the respective partial patterns projected onto the scene in the different fields of view 86, 88, 90, . . . are mutually orthogonal. In this case, these partial patterns themselves can serve as the matched filters. The image processor may perform a correlation computation between the image output from sensor 80 and each of these partial patterns in order to extract the individual images of the partial patterns and find local pattern shifts as a function of position in each of the fields of view. The processor uses these pattern shifts in computing a depth map (with wide FOV), as described above.

As in the preceding embodiment, the use of the array of lenses 82, each with a moderate individual FOV, enables the system to achieve a wide overall FOV at low cost, while maintaining a compact optical configuration.

In an alternative embodiment, the optical arrangement shown in FIG. 4 can be used to provide a sort of "zoom" functionality in pattern detection and depth mapping. In this embodiment, projection module 23 initially projects a given pattern over the entire combined FOV of the array of lenses 82. The image processor processes all of the individual images, as described above, to give a wide-angle, low-resolution depth map. The image processor may identify an object of interest in a certain sector of this depth map, within one or more of fields of view 86, 88, 90, . . . . The image processor may then instruct projection module 23 to adjust its optical configuration so that the pattern is projected, possibly with higher resolution, only into the limited sector in which the object is located.

The dimensions of the projected pattern in this "zoom" mode are less than or equal to the dimensions of the FOV of a single lens 82, while the pattern itself may be contained within the FOV of a single lens or may overlap the fields of view of two or more of the lenses. As a result, imaging module 25 will receive a single image of the pattern, via one or more of lenses 82, without other superimposed images of the pattern as in the wide-angle mode. The image processor may process this individual image in order to create an enhanced-resolution depth map of the object of interest. Thus, system 20 has simultaneously large FOV and high resolution and is able to choose a high-resolution sub-image from within the large FOV.

Compact Pattern Projectors

When projection module 23 is required to project a pattern over a wide FOV, the projection lens may suffer from similar problems of size and cost as are encountered by the imaging lenses in the wide FOV imaging configurations described above. Furthermore, when coherent illumination is used, large, wide-angle projection lenses can exacerbate eye safety concerns. The embodiments described below address these issues.

Figure 5:
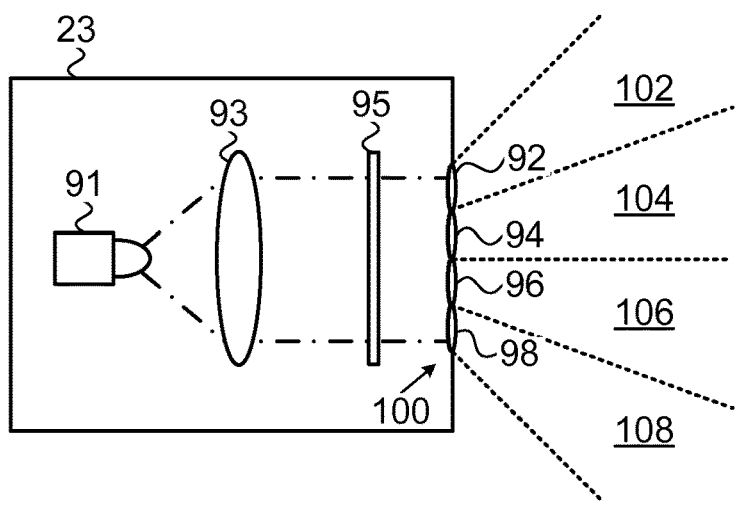
FIG. 5 is a schematic side view of a projection module, in accordance with an embodiment of the present invention.

FIG. 5 is a schematic side view of projection module 23, in accordance with an embodiment of the present invention. The module comprises a light source 91, such as a laser diode or LED. A condenser, such as a lens 93, collimates or gathers, shapes, and directs the beam of light emitted by the light source toward a transparency 95, which is interposed in the beam and typically creates a pattern of light and dark spots. Light source 91, lens 93 and transparency 95 together serve as a patterned illumination source.

Transparency 95 may comprise any of a wide range of optical components. The transparency may comprise, for example, a gray-level or otherwise patterned optical element or a patterned microlens array (MLA), as described in the above-mentioned PCT International Publication WO 2008/120217, or any other suitable sort of patterned refractive of diffractive optical element (DOE).

The pattern created by this illumination source is projected onto the scene of interest by an array 100 of projection lenses 92, 94, 96, 98. These lenses each project a part of the overall pattern onto a respective FOV 102, 104, 106, 108, although there may be small overlaps or gaps between the respective parts of the pattern projected by the individual lenses. Thus, the lenses of array 100 together project the pattern onto a wide overall FOV, typically 120° wide or more, with each lens projecting its part of the pattern onto a different, respective area of the scene. The use of an array of small lenses of this sort makes module 23 smaller and, typically, less costly to manufacture, while improving the performance of the individual lenses and thus of the whole array. Although only one dimension of array 100 is shown in this figure, the projection lenses may be arrayed in two dimensions, i.e., into the page as well as vertically in the view presented here. Furthermore, although the lenses in FIGS. 5 and 6 are shown in the figures as simple lenses, in practice compound lenses may be used in all embodiments of projection module 23.

Figure 6:
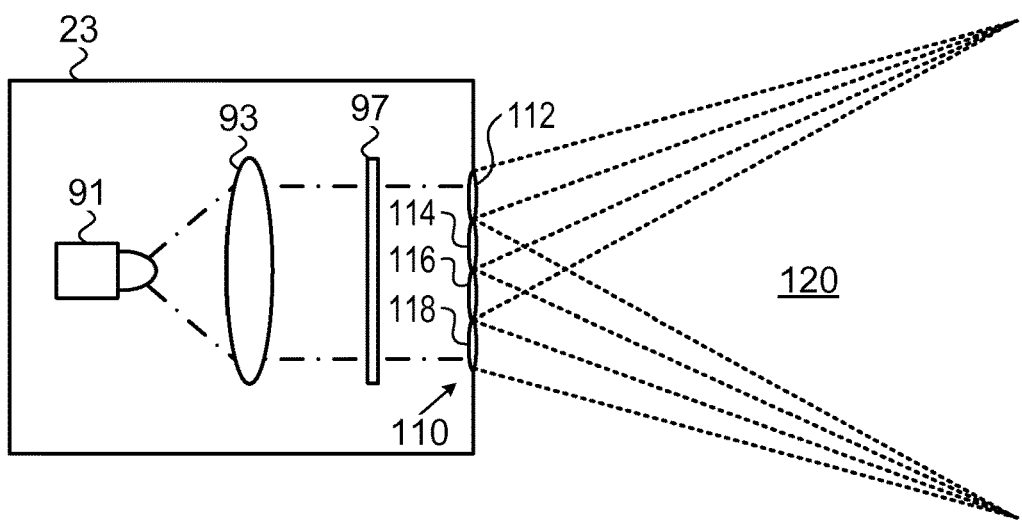
FIG. 6 is a schematic side view of a projection module, in accordance with another embodiment of the present invention.

FIG. 6 is a schematic side view of projection module 23 in accordance with another embodiment of the present invention. This embodiment shares the benefits of compactness, low cost, and improved performance with the preceding embodiment, while adding the benefit of enhanced eye safety. In this case, projection lenses 112, 114, 116, 118, . . . in an array 110 are all configured to project respective parts of the pattern generated by an illumination source including a transparency 97 onto the same FOV 120. (Transparency 97 may comprise any of the types of transparencies mentioned above in reference to transparency 95.) Each of the projection lenses, in other words, projects its own pattern, generated by the corresponding part of transparency 97 (or equivalently, each of the lenses may be associated with its own pattern generating element) onto an area of the scene that is common to all of the lenses. The resulting pattern in FOV 120 is a superposition of all the individual patterns cast by the lenses. Intricate patterns can be created in this manner.

The eye safety is enhanced in this embodiment due to the following consideration: The light power that a projector can safely emit is defined by the AEL (Accessible Emission Limit). For an extended source, the AEL is proportional to the angular subtense of the source, referred to as α, as well as by the f# of the projections lens, the FOV, and the area of the source (in this case the area of transparency 97). Maintaining the same area of transparency 97, the same f# for the projection lenses, and the same FOV, but dividing the projection lens into an array of n×n lenses, for example, will provide a factor of n increase in the AEL for the whole system. The reason for this increase is that the aperture of each lens has an angular subtense that is 1/n of the original angular subtense, but there are n×n such apertures, so that overall the system can project n times more power while maintaining the same level of eye-safety.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Projection apparatus, comprising:
an illumination source, which is configured to generate a pattern of illumination comprising light and dark spots; and
an array of lenses, positioned so that the lenses in the array project different, respective parts of the pattern of the light and dark spots onto a scene;

wherein the lenses are configured to project the respective parts of the pattern onto different, respective areas of the scene.

2. The apparatus according to claim 1, wherein the illumination source comprises a light source and a condenser, which are configured to generate a beam of light, and a transparency, which is interposed in the beam.

3. The apparatus according to claim 1, wherein the lenses are configured to project the respective parts of the pattern onto a common area of the scene.

4. The apparatus according to claim 1, and comprising an imaging module, which is configured to generate electronic images of the pattern on the scene, and a processor, which is configured to process the electronic images so as to generate a depth map of the scene responsively to the pattern appearing in the images.

5. A method for projection, comprising:
    generating a pattern of illumination comprising light and dark spots; and
    positioning an array of lenses so that the lenses in the array project different, respective parts of the pattern of the light and dark spots onto a scene;
    wherein the lenses are configured to project the respective parts of the pattern onto different, respective areas of the scene.

6. The method according to claim 5, wherein generating the pattern comprises transmitting a beam of light through a transparency, which is configured to impose the pattern on the beam.

7. The method according to claim 5, wherein the lenses are configured to project the respective parts of the pattern onto a common area of the scene.

8. The method according to claim 5, and comprising generating electronic images of the pattern on the scene, and processing the electronic images so as to generate a depth map of the scene responsively to the pattern appearing in the images.

* * * * *